United States Patent [19]

Ciminera et al.

[11] 4,256,276

[45] Mar. 17, 1981

[54] ADJUSTABLE AIRPLANE APPENDAGES FOR WAVE DRAG REDUCTION

[75] Inventors: Victor R. Ciminera, Farmingville; Ronald H. Hendrickson, Massapequa, both of N.Y.

[73] Assignee: Grumman Aerospace Corporation, Bethpage, N.Y.

[21] Appl. No.: 924,641

[22] Filed: Jul. 14, 1978

[51] Int. Cl.³ ................................................ B64C 7/00
[52] U.S. Cl. .................................. 244/118.1; 244/130; 244/137 R
[58] Field of Search ............... 244/203, 118 R, 137 R, 244/130, 2, 160, 162, 46, 1 N

[56] References Cited

U.S. PATENT DOCUMENTS

| 2,936,137 | 5/1960 | Kleminsky | 244/93 |
| 3,624,833 | 11/1971 | Ricard | 244/118 R |
| 3,737,121 | 6/1973 | Jones | 244/46 |
| 3,940,094 | 2/1976 | Kress et al. | 244/203 |
| 4,053,125 | 10/1977 | Ratony | 244/46 |
| 4,139,172 | 2/1979 | Miller et al. | 244/46 |

FOREIGN PATENT DOCUMENTS

| 932410 | 9/1955 | Fed. Rep. of Germany | 244/130 |
| 2426061 | 12/1975 | Fed. Rep. of Germany | 244/46 |
| 1441827 | 7/1976 | United Kingdom | 244/118 R |

*Primary Examiner*—Galen L. Barefoot
*Attorney, Agent, or Firm*—Richard G. Geib; Bruce B. Brunda

[57] ABSTRACT

Movable appendages or stores containers that are positioned controlled in regard to an airplane so as to approximate the cross-sectional area distribution of a minimum drag body of revolution through varied flight regimes of the airplane from take-off to landing and thereby obtain favorable interaction of pressure fields throughout such flight regimes and adjust the store increment on the locus of least drag points in deference to the teaching of the prior art to design the location and shape of such appendages in a compromise position for but one portion of an airplane's flight regime; i.e., normal cruise altitude and speed.

5 Claims, 11 Drawing Figures

U.S. Patent  Mar. 17, 1981  Sheet 1 of 3  4,256,276

ADJUSTABLE AIRPLANE APPENDAGES FOR WAVE DRAG REDUCTION

BACKGROUND

As is perhaps best stated by German Pat. No. 932,410 issued Sept. 1, 1955 found in the library of the Office of Patents and Trademarks and the Examiner's foreign art for Class 244, subclass 130 of the U.S. Office of Patents and Trademarks, one should consider the plot of the sum of displacement cross sections of an airplane to provide the optimum area diagram therefor that leads to reduced wave drag. As one skilled in the art known there is a one to one correspondence between airplane area distribution and its wave drag.

The object of some skilled in the art from the teaching of such has been to not only "area rule" an airplane for best wing-body airflow interaction, but to use external stores and podded engines to effect the best area distribution; i.e., one that may be plotted like that of a surface of revolution rising from the nose and reaching a highpoint about midway and decreasing to zero beyond the empennage. The object being to fix appendages so as to eliminate stepwise increases or decreases, as well as repeated changes in the increase or decrease of the area diagram as precipitated by the sum of displacement cross sections which lie in common and consecutive airplane cross-sectional planes.

On the other hand, the main body of those skilled in the art have reacted to the problem of airplane area distribution by designing the airplane clean (without appendages). Others have tried to minimize the problem of airplane area distribution by area ruling and selecting power plants to obtain optimum performance at a particular design point. The SST is an example of this approach. With certain airplanes, appendages thereto must take into account e.g. limitations. In such instances there has been heretofore little opportunity to area rule the design. Instead designers have employed fairings, etc., to minimize aerodynamic problems of the combination of appendages to the airplane.

No one prior to this invention has studied the concept, as first explored in the aforesaid German Patent since it became part of the knowledge for one skilled in the art to see if with the concept one could improve an airplane performance throughout its flight regimes from take off to landing.

It is believed, as with many things today, that as long as one has unlimited energy resources, one merely applies more energy to overcome any drag associated with irregularities of airplane surface area. It is in this area that this invention shall attempt to disclose more practical cost and energy effective design variables to those skilled in the art.

FIELD OF INVENTION

This invention relates to attachment of bodies from an airplane so that they may move in accordance with variation in Mach No. and altitude so as to reduce drag penalties.

SUMMARY

This invention will allow those skilled in the art of airplane design to vary the optimum position of appendages to an airplane that will result in appendage drag increments corresponding to the locus of least drag points.

This invention will also permit those skilled in the art of airplane design to maximize c.g. optimization and thereby minimize trim drag penalties for changing airplane characteristics during flight.

DRAWING DESCRIPTION

With reference only to the attached drawings they may be outlined:

DETAILED DESCRIPTION

As will be appreciated by one skilled in the art, the aerodynamic characteristics of the various parts (fuselage, wings, empennage) of an airplane are influenced by the overall configuration and the relative positions of such parts. The value of this invention is best understood by such skilled in the art upon recalling the reason and function of area-rule aerodynamics. That is to say if one were to plot the distribution of cross-sectional area of an airplane, one would observe a number of discontinuities with respect to an optimum body of revolution; i.e., each aft succeeding station along the fuselage would, with the projections therefrom in summation therewith, be other than a smooth curve from the tip to tail. Each departure outwardly and inwardly from the smooth curve creates an aerodynamic problem.

In the German Patent aforesaid, the intent was to cut away areas of the fuselage and add areas by streamline bodies to obtain a uniform increase and decrease of cross-sectional area. That solution though was to arrive at such a distribution of area for a certain flight regime; i.e., normal cruise altitude and speed. It has been found that that which works for one set of conditions such as cruise speed and altitude does not adequately create the best drag trim for an airplane's total flight envelope. In order to better address the variable aerodynamics, it was found that variable external body placement not only allowed for reducing the drag penalty for such appendages over the total flight regime, but also allowed one to use the area of the store to smooth out discontinuities in the cross-sectional area summation plot.

Figure 1:
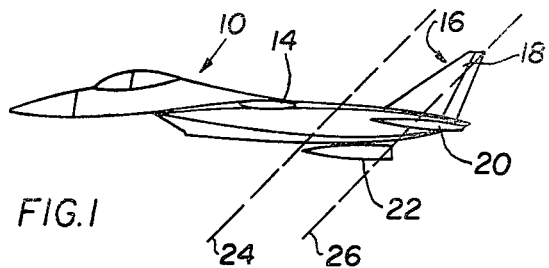
FIG. 1 is a side view of an airplane with an appendage suspended from it located in an aft position.

With specific reference now to FIG. 1, there is shown an airplane 10 having a fuselage 12, wings 14, and empennage 16 of rudder 18 and elevator 20. As depicted, this is an interceptor type airplane having internal engines and an external store appended thereto under the wing in the form of the streamlined body 22. The dash lines 24 and 26 represent the axial extent of a pressure field created by airflow about body 22.

Figure 2:
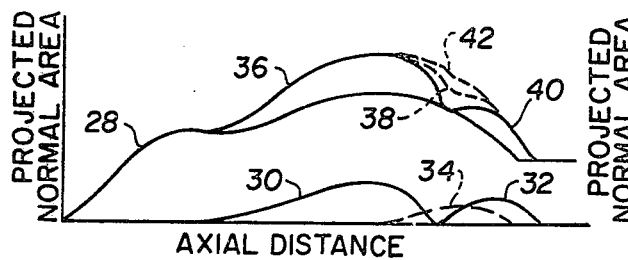
FIG. 2 is a graphical representation of the plot of cross-sectional distribution of the airplane of FIG. 1 showing in phantom the effect of the location of the appendage of FIG. 1.

In FIG. 2 there is shown a plot 28 of the fuselage cross-sectional area distribution from nose to tail (left to right). Plots 30 and 32 are the wing and dorsal fin (rudder) cross-sectional distribution at various fuselage stations. The dash line 34 represents the area of the elevator cross-section. Putting all this on that of the area plot 28 for the fuselage, one would have lines 36, 38 and 40 summing the airplane cross-sectional area. As can be readily seen, there is still an inward discontinuity between wing and fin locations.

It is possible to move appendage 22 into this area to fill out the sum of cross-sectional area distribution between wing and fin peaks overlying elevator area. In doing so, a plot shown by dotted line 42 is representative of the solution afforded herewith. This is so in that the pressure field 24 from the nose is applied to the wing boattail, creating thrust, while the expansion field from the store boattail tucks in with the maximum fin area.

Figure 3:
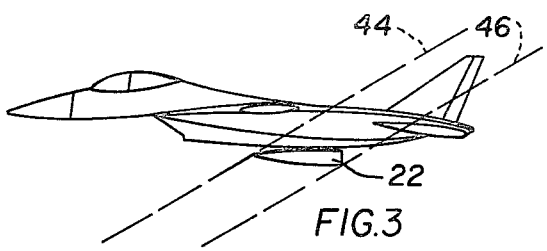
FIG. 3 is another side view of the airplane but with the appendage suspended therefrom located in a position forward of that illustrated by FIG. 1.
Figure 4:
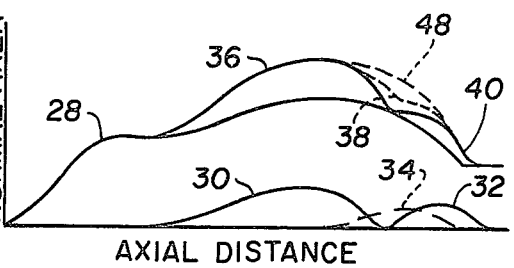
FIG. 4 is a graphical representation like FIG. 2 but for the airplane of FIG. 3.

It is because of the fact that these pressure and expansion fields vary as Mach No., angle of attack, sideslip that this visualization from a far field, linearized viewpoint will not hold for all such variables. At a different Mach No. or incidence angle, the store 22 is moved forward or aft as in FIG. 3 to accommodate greater slope for the pressure field and expansion field 44 and 46 so as to create the same favorable interference phenomenon where a line 48 shows there is effected a filling of the cross-sectional area distribution in approximation of the favorable form of a body of revolution (see FIG. 4).

Figure 5:
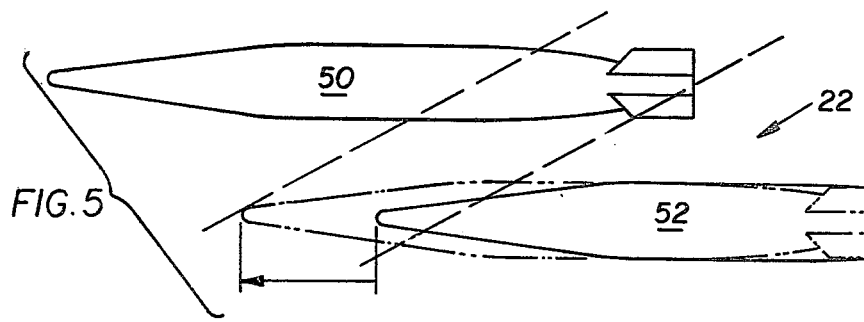
FIG. 5 is a showing of a multiple store (appendage) arrangement in plane view with one such store shown in phantom to be movable as both are from a position having one fineness ratio that is extended when moved to the solid line position.
Figure 7:
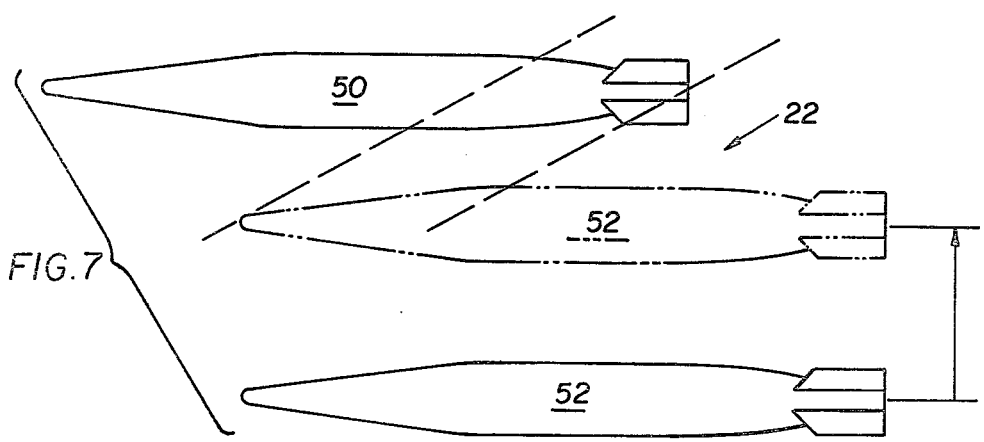
FIG. 7 is a showing in plan view of still another arrangement possible for suspended bodies (stores) according to this invention illustrating lateral movement to tuck in said bodies as the flight regime would call for in providing desired wave drag for an airplane.

The appendage, store pod 22 or by whatever name one skilled in the art may use, is shown by FIGS. 5 and 7 to be comprised of two side by side streamline bodies 50 and 52. In FIG. 5, these bodies are movable relative to each other to an axial manner (store 52 has moved from the phantom-line position to one aft of that); or, in FIG. 7, they move relative to each other in a sense so as to increase or decrease lateral (side) separation distance. It is also to be noted that, with the longitudinal and lateral relative movement of the appendages, it is possible, when they are located for optimum drag trim of the airplane, to increase the effective fineness ratio of the appendages from a far field viewpoint. This will enable the designer to obtain significant reductions in the overall drag increment of the appendages.

Figure 6:
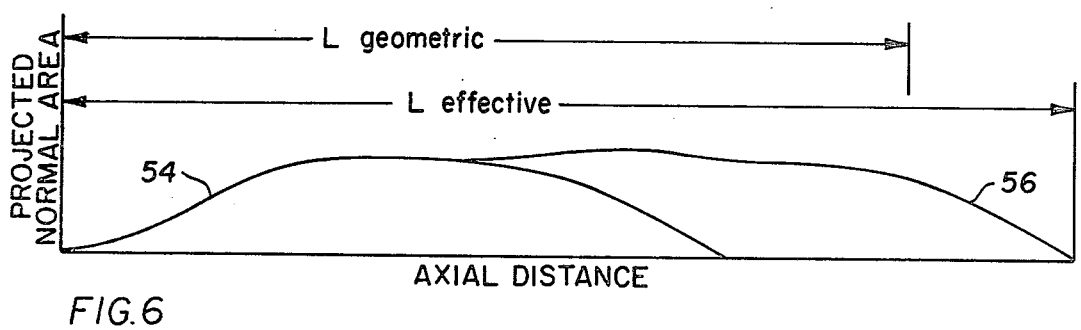
FIG. 6 is a graphical representation of the longer effective fineness ratio of the combination of bodies of FIG. 5.

It is thus that one may now realize the favorable interference of multiple stores. As seen by FIG. 6, the pressure field 54 from the nose of store 52 is applied to the boattail 56 of an adjacent store 50. It is thus that the geometric length (L geometric of FIG. 6) is lengthened to the L effective as shown for the store to provide the longer effective fineness ratio body from a far-field viewpoint above stated. It is to be noted that although only one store 52 is depicted as translating in both FIGS. 5 and 7, a movement of both stores about a plane of symmetry may be required, and is possible with the structure of this invention shown by FIGS. 8 and 9.

Figure 8:
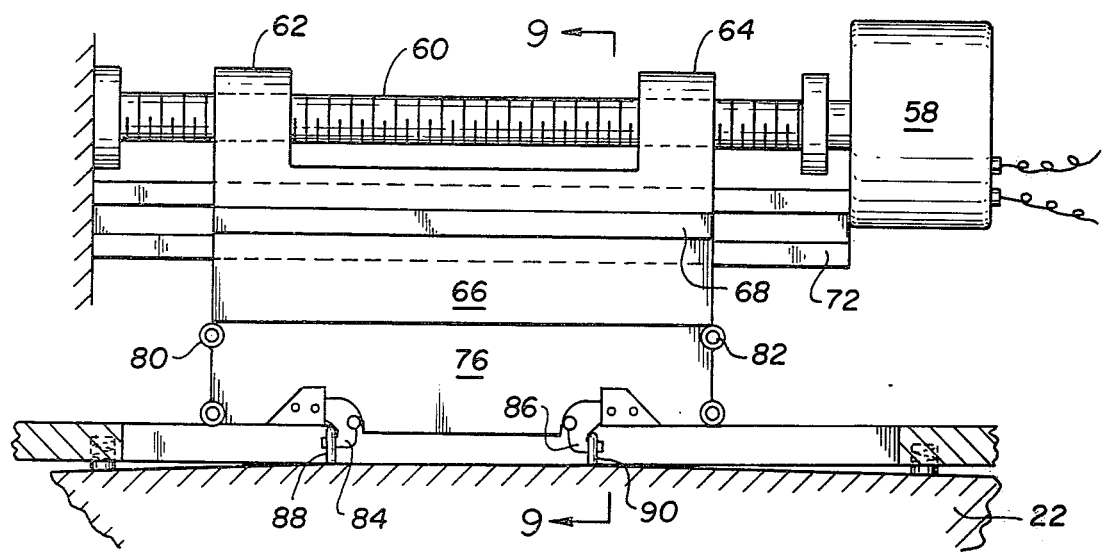
FIG. 8 is a partial cross-sectioned side view of an actuator and mounting apparatus for the bodies of FIGS. 1, 3, 5 and 7.
Figure 9:
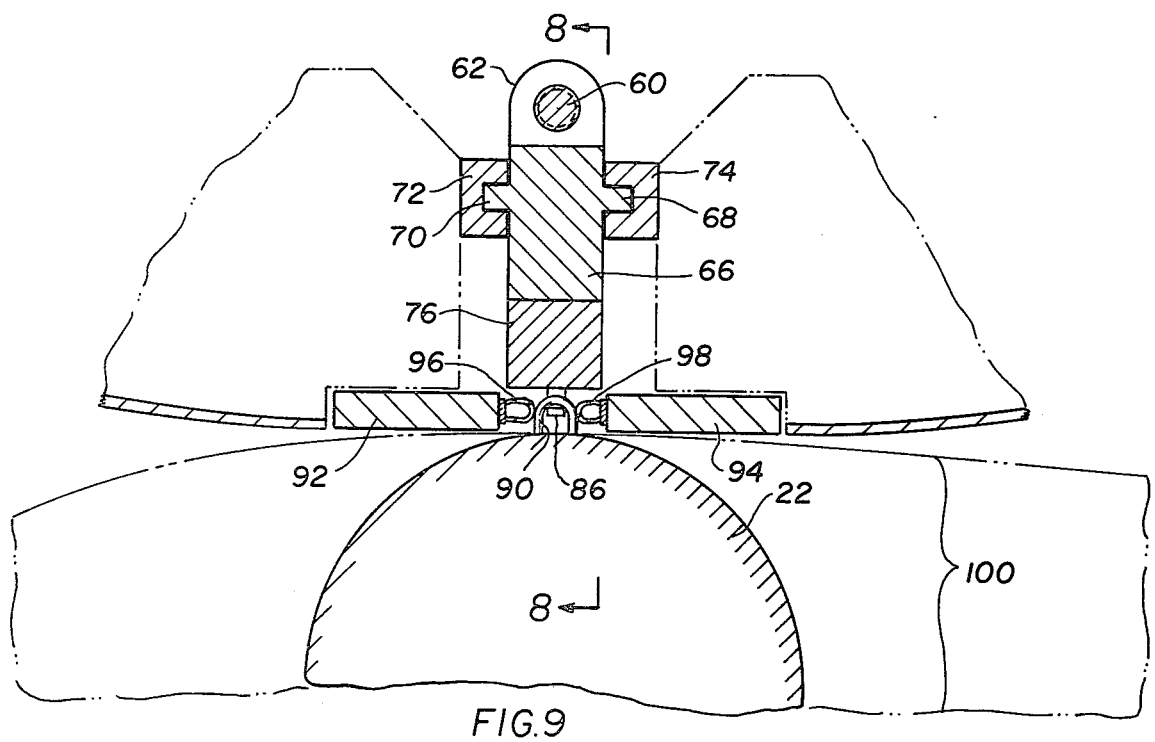
FIG. 9 is a partial cross-sectioned end view of the structure of FIG. 8.

With more specific reference to FIG. 8, there a concept for translating the external stores carriage system in the fore and aft direction is shown. The system depicted an electric motor 58 operating a worm drive 60 that on rotation in cooperating threaded lugs or gears 62 and 64 of the suspension support 66 move it (66) in a fore and aft direction. The suspension support includes side rails 68 and 70 for sliding support in side channels 72 and 74. A typical store support rack 76 is attached by pins 80 and 82 at each end that will permit the rack 76 to move laterally of the suspension support. It will be readily appreciated by one skilled in the art to use anti-friction means of one nature or another (ball bearings, teflon bearings, etc.) between sliding surfaces. The rack includes fingers 84 and 86 to grasp hooks 88 and 90 of the store 22. Plates 92 and 94 close the airplane opening for the system. Seals 96 and 98 face each other from adjacent plate edges to close the gap between the plates 92 and 94. The phantom line 100 shows the appendage 22 being mounted in FIG. 9, 90° from the position shown by solid lines. This is to show those skilled in the art that to move appendages laterally of one another and the airplane, the system of FIGS. 8 and 9 only need to be mounted to move laterally of the airplane axis.

Actuation of the motor 58 and thus the system can be automatic as a function of Mach No., etc., or manually controlled as by a Mach Sweep Programmer such as described by U.S. Pat. No. 3,940,094 issued Feb. 24, 1976 and incorporated herein by reference thereto.

It will be readily appreciated by those skilled in the art that other attributes are possible upon an understanding of the invention. For example, in any airplane in flight the c.g. travel is to be reckoned with. This is a problem that can best be visualized by realizing the attitude one must present the airplane to in its line of flight; i.e., a pitch up or down effective profile. This can be extremely costly by way of energy requirements for continued flight as so trimmed. By moving stores to trim for c.g. travel, this problem is, for normal conditions, eliminated. As a result, this invention provides for still another benefit of energy conservation and the attendant ecological benefits. With this invention, it is possible to vary location of the structure of airplane appendages from one station along the airplane axis to another again per a program which utilizes predetermined information on c.g. travel. This is in sharp contrast to known prior art techniques such as depicted in U.S. Pat. Nos. 2,823,880 and 2,936,137 copies of which may be found in the U.S. Patent Office Class 244 subclass 93.

Also in recent tactical aircraft, the need for external structures is even more apparent and real. There this need has reached the extreme that persons skilled in the art have had to use station location for store type structures where air loads present problems to the release of same. Fact of the matter is prior to this invention, the store ejection mechanisms had to be tailored for each different store suspension station to prevent store/airplane interference on release. With this invention, it is possible to optimize the store location to obtain favorable interaction of pressure fields throughout the airplane's total flight regime and also move the store to a position where air loads do not at the time of store release, create problems in obtaining clean release thereof.

Figure 10:
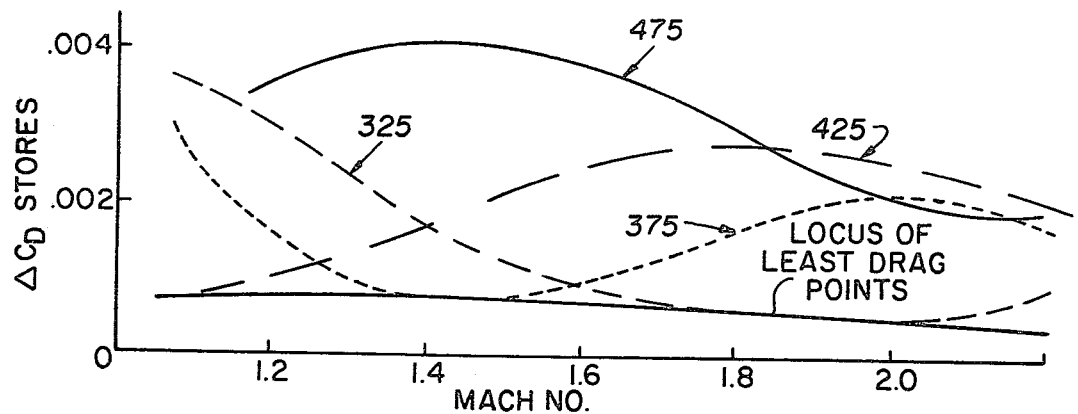
FIG. 10 is a graphical representation of the store drag increment at various Mach Numbers for a specific airplane.
Figure 11:
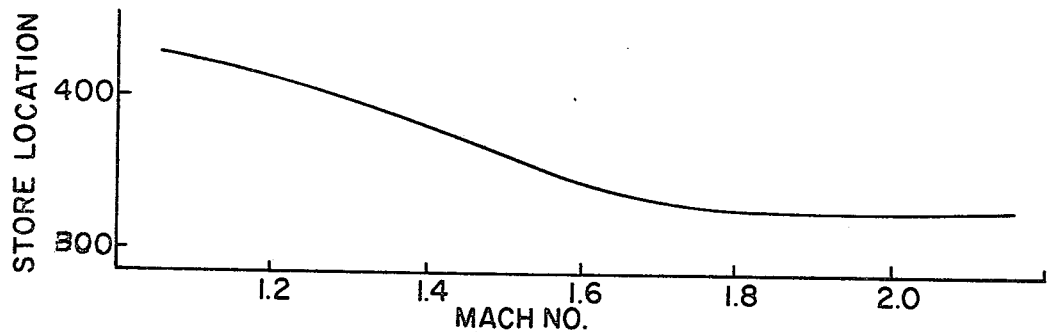
FIG. 11 is a graphical representation of store travel over a limited range of Mach Numbers.

One skilled in the art should not, however, lose sight of the advantage of this invention of using in-flight adjustment of location of external bodies to obtain favorable interaction of pressure fields throughout the various flight regimes of an airplane. For example, with reference to FIG. 10, the store drag increment is plotted against airplane Mach No. to show that in fixed station locations; i.e., 325, 375, 425 and 475, the plots only approach the locus of least drag points at very narrow limits of Mach No. Considering this fact, as plotted on the airplane used for the calculations, the store drag increment is lowest for low Mach Nos. at aft station locations; e.g.; 425 and 475, and lowest for higher Mach Nos. at forward stations, 375 and 325. With reference to FIG. 11, the advantage aforesaid is depicted showing for the airplane used in FIG. 10, a travel for the appendages from station 475 through 325 from Mach 1 through 2.0 flight of the airplane. By such, it is for the first time to be realized that one may hold the store drag increment on the locus of least drag points. This saves, as one skilled in the art may realize from FIG. 10, 20 counts of drag (one count equals 0.0001) and this would allow a designer to plot in the ability to increase take-off weight some 2,000 lbs. (100 lbs. wt./count).

Having described an operative embodiment of this invention and the benefits to be expected from it, it is now desired to set forth the claims of these Letters Patent as follows:

We claim:

1. For an airplane with a fuselage having an empennage of a dorsal fin and elevator and wings all of which present a cross-sectional area distribution that has discontinuities from nose to tail of the airplane, a means to arrange external appendages to the airplane to fill in any area discontinuities and minimize drag penalties during flight of the airplane, said means comprising:

attachment means for uniting said appendages with the airplane, said attachment means being mounted to the airplane so as to move along an axis parallel to the longitudinal axis of the airplane;

actuator means connected between the airplane and said attachment means; and means to operate said actuator means to move said attachment means and variably position said appendages along their axis in flight of the airplane to an aft position at low Mach speed operation of the airplane and a forward position at high Mach speed operation of the airplane so as to reposition the pressure field of the store to track with the changing area diagram discontinuities between forward and aft portions of the fuselage, such as arises typically between wing and empennage of the airplane in flight, to decrease drag.

2. Means to effectively minimize the wave drag for all flight regimes of an airplane as results from the movement of discontinuities in cross-sectional area distribution of wings and empennage on a fuselage of the airplane, said means comprising:

external appendages for use with the airplane;

means to mount the appendages to the airplane, said means to mount including a store support rack attached to the airplane by means that will permit its movement relative to and along an axis parallel to the longitudinal axis of the airplane;

actuator means connected between said store support rack and said airplane, said actuator means being operative to vary the position of the external appendages along their axis relative to the airplane in flight so as to obtain favorable interaction of pressure fields and thereby fill in discontinuities of the cross-sectional area distribution as such varies along the axis of the airplane throughout the flight regime of the airplane; i.e., low speed, cruise speed, high speed, climb, level flight, descending with forward c.g., normal c.g., and aft c.g.

3. An airplane comprising:

a fuselage;

a wing carried by said fuselage;

an empennage carried by said fuselage;

external stores;

a store rack means mounted to said wing so as to move linearly relative to said wing, said store rack means being used to mount the external stores to the wing; and an actuator means attached to the airplane and the store rack means to adjust the location of said store rack means along linear axes so as to move the external stores in flight to obtain favorable interaction of pressure fields throughout the airplane's flight regimes.

4. The airplane of claim 3 wherein the store rack means includes multiple mounting points to the wing having span separation under the wing and said actuator means is adapted to provide relative motion between said external stores.

5. The airplane of claim 3 wherein the store rack means includes multiple mounting points having chordal and span separation under the wing and said actuator means is adapted to provide relative motion between said stores.

* * * * *